United States Patent [19]
Kusumoto et al.

[11] Patent Number: 5,283,898
[45] Date of Patent: Feb. 1, 1994

[54] SYSTEM AND METHOD FOR MAINTAINING A MUTUAL RELATIONSHIP BETWEEN OBJECTS

[75] Inventors: Koji Kusumoto; Makoto Murata; Toru Aratani, all of Kawasaki, Japan

[73] Assignee: Fuji Xerox Co., Ltd., Japan

[21] Appl. No.: 783,373

[22] Filed: Oct. 28, 1991

[30] Foreign Application Priority Data

Oct. 29, 1990 [JP] Japan .................. 2-291012

[51] Int. Cl.⁵ ............................................. G06F 9/40
[52] U.S. Cl. .................. 395/650; 364/DIG. 1; 364/281.3; 364/281.7
[58] Field of Search ............. 395/650; 364/DIG. 1, 364/281.3, 281.7

[56] References Cited
U.S. PATENT DOCUMENTS

| | | | |
|---|---|---|---|
| 4,885,717 | 12/1989 | Beck et al. | 364/900 |
| 5,041,992 | 8/1991 | Cunningham et al. | 364/518 |
| 5,151,987 | 9/1992 | Abraham et al. | 395/575 |

OTHER PUBLICATIONS

"Object Oriented Systems Analysis", Shaer, S. and Meller, S. J., Yourdon Press Computing Series, 1988.

*Primary Examiner*—Gareth D. Shaw
*Assistant Examiner*—A. Katbab
*Attorney, Agent, or Firm*—Welsh & Katz, Ltd.

[57] ABSTRACT

A way and a system for invoking a method in an object-oriented language which is so arranged that when a predetermined method for a first whole object is invoked, two instance variables of the first whole object maintain an exclusive relationship while the exclusive relationship is also satisfied between first and second part objects. In such an arrangement, when a message is sent from a second whole object to the first part object and the exclusive relationship cannot be satisfied between the first and second part objects, a daemon method for the first whole object is invoked to send a message from the first whole object to the second part object, thereby maintaining the exclusive relationship between the first and second part objects.

7 Claims, 10 Drawing Sheets

FIG. 9B

PAGE VIEW

DAEMON: A MEDIATOR THAT KEEPS WHOLES CONSISTENT WITH THEIR PARTS

MAKOTO MURATA AND KOJI KUSUMOTO

SYSTEM TECHNOLOGY RESEARCH LABORATORY, FUJI XEROX CO. LTD

ABSTRACT

COMPUTATION IN OBJECT-ORIENTED PROGRAMING— — — — — — — — — —
— — — — — — — — —
— — — — —
— — —

INTRODUCTION

METHODS OF AN OBJECT— — — — — —
— — — —
— — —

— — — — — — — — —
— — — — — — —

SYSTEM AND METHOD FOR MAINTAINING A MUTUAL RELATIONSHIP BETWEEN OBJECTS

BACKGROUND OF THE INVENTION

1. Field of the Invention

The present invention relates to an object-oriented language and more particularly, to a way and a system for invoking a method in the object-oriented language from a part object to a whole object dependent on the part object.

2. Description of the Related Art

In a computer realizing an object-oriented language, as shown in FIG. 10, there are present a whole object 111 and a part object 113 bound by an instance variable 112 which the whole object 111 possesses, so that the invocation of a method 114 for the whole object 111 causes a message to be sent from the whole object 111 to the part object 113. The part object 113, when receiving the message from the whole object, invokes its own method.

Such a procedure is repeated so that the message is further sent from the part object to a sub-part object of the part object. Accordingly, computation in the object-oriented language is carried out by sequentially sending the message in a direction from the whole object toward the part object to invoke the method.

The details of a way of invoking a method in the object-oriented language is disclosed, for example, in a publication "Smalltalk-80: The Language and Its Implementation", by Goldberg, A. and Robson, D., Addison-Wesley, 1983.

However, such a system that can send a message in a direction from a whole object toward a part object and can invoke a method on the basis of only the message, has had a problem, for example, in a case where a certain part object is bound by the respective instance variables of a plurality of whole objects.

For example, when there are present first and second whole objects 121 and 122 and a part object 123 belonging to both of the whole objects as shown in FIG. 11, the part object 123 is bound by respective instance variables 124 and 125 of the first and second whole objects 121 and 122, so that the part object 123 can receive messages from the both whole objects. It is now assumed that such an exclusive relationship that one of the two instance variables 124 and 127 of the whole object 121 is turned "ON" while the other is turned "OFF" must be satisfied. In this case, since the two instance variables 124 and 127 satisfy the exclusive relationship, when a method 126 of the whole object 121 is invoked, a message is sent from the first whole object 121 to the part object 123 while another message is sent from the whole object 121 to the other part object 128, in which case an exclusive relationship is maintained between these part objects 123 and 128.

However, when a method (not shown) of the second whole object 122 is invoked to send a message from the second whole object 122 to the part object 123 as shown in FIG. 12, the part object 123 is operated but the method 126 of the first whole object 121 is not invoked, which results in that the message to be sent via the instance variable 127 of the first whole object 121 is not sent to the part object 128 and therefore the exclusive relationship cannot be satisfied between the part objects 123 and 128.

In other words, when a part object is shared by a plurality of whole objects or a message to a part object is not sent necessarily via its predetermined whole object, a predetermined mutual relationship between part objects cannot be always satisfied. This results from the fact that, upon transmission of a message to a part object, a predetermined method for satisfying the mutual relationship in the plurality of whole objects is not invoked.

SUMMARY OF THE INVENTION

It is therefore an object of the present invention to provide a way and a system for invoking a method in an object-oriented language according to which a mutual relationship between a plurality of objects is always satisfied.

In accordance with an aspect of the present invention, there is provided a method invoking system in an object-oriented language which comprises a whole object; a part object bound by an instance variable of the whole object; first storage means for storing therein pointers by which the whole object is derived from the part object; second storage means for storing therein indices indicating the instance variable of the whole object binding the part object; and third storage means for storing therein a method of the whole object in correspondence with the instance variable of the whole object and messages which are to be received by the part object, wherein, when the part object receives a message from another object, the system derives the whole object on the basis of the pointers stored in the first storage means, retrieves the instance variable binding the part object from the second storage means in which the indices indicating the instance variable of the whole object are stored, retrieves the method corresponding to the retrieved instance variable and the message from the third storage means, and invokes the retrieved method.

According to the present invention, since the system is so arranged that, when a part object receives a message from another object, the system derives a whole object having an instance variable binding the part object and invokes a method corresponding to the instance variable and the message, a mutual relationship between a plurality of objects including the part object can be satisfied by the whole object.

DESCRIPTION OF THE PREFERRED EMBODIMENTS

An embodiment of the present invention will be explained in detail with reference to the accompanying drawings. The basic principle of the present invention is described in an article titled "Daemon: Another Way of Invoking Methods" in a "Journal of Object-Oriented Programming" published in U.S., July/August, 1989.

Figure 1:
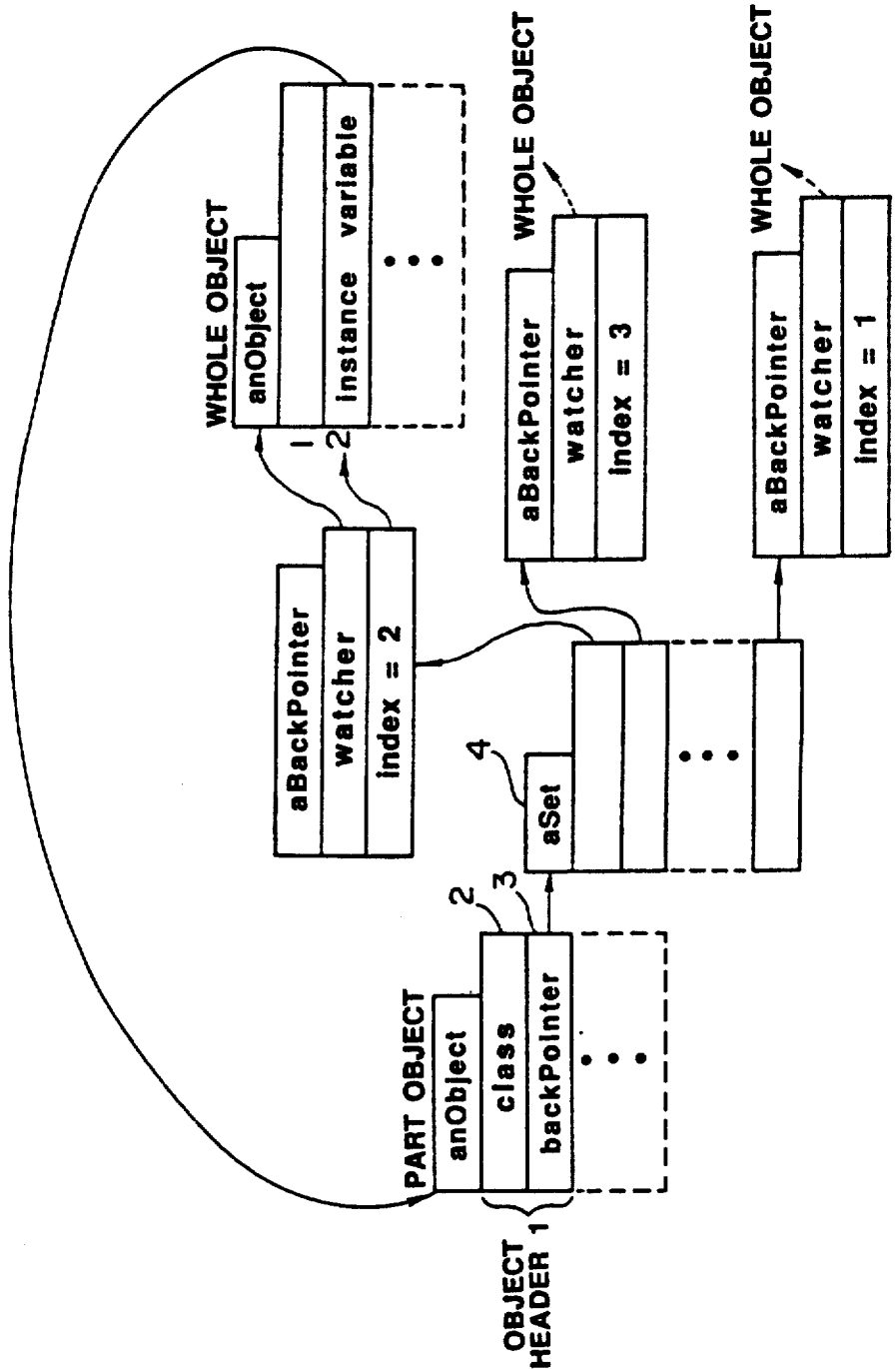
FIG. 1 is a part of a structure of a method invoking system in accordance with an embodiment of the present invention, showing a relationship between a part object and a whole object in the embodiment.

Referring first to FIG. 1, there is partially shown an arrangement of a method invoking system in accordance with an embodiment of the present invention, in particular, between part and whole objects. In the drawing, the part object includes an object header 1 which has a class column 2 ("class" column) in which the "class" to which the associated part object belongs is written and a back pointer column 3 ("backPointer" column). The provision of the back pointer column 3 is different from the prior art.

The back pointer column 3 has a set 4 in which back pointers indicative of whole objects which can send messages to the associated part object are stored. Stored in the back pointers are whole objects (for example, named as "watcher") having instance variables binding the associated part object as well as indices (for example, named as "index") indicating the instance variables. Accordingly, reference of the back pointer column 3 enables derivation of the whole objects binding the associated part object and instance variables thereof.

It should be noted that the back pointer column 3 is provided in the object header 1 of the part object, the back pointer column 3 can also be provided to the part object as instance variables of the part object by making the part object an instance of a subclass of the original class of the part object. In this case, the back pointer column is referred to as the instance variable of the part object.

Further, for providing the back pointer column 3, a class unique to the part object may be defined as a subclass of the class of the part object, for example. In this case, the class unique to the part object is referred to in the class column 2 of the object header 1, the unique class is derived by referring to the class column 2 and reference of the back pointer column in the derived unique class enables derivation of the whole objects.

Figure 2:
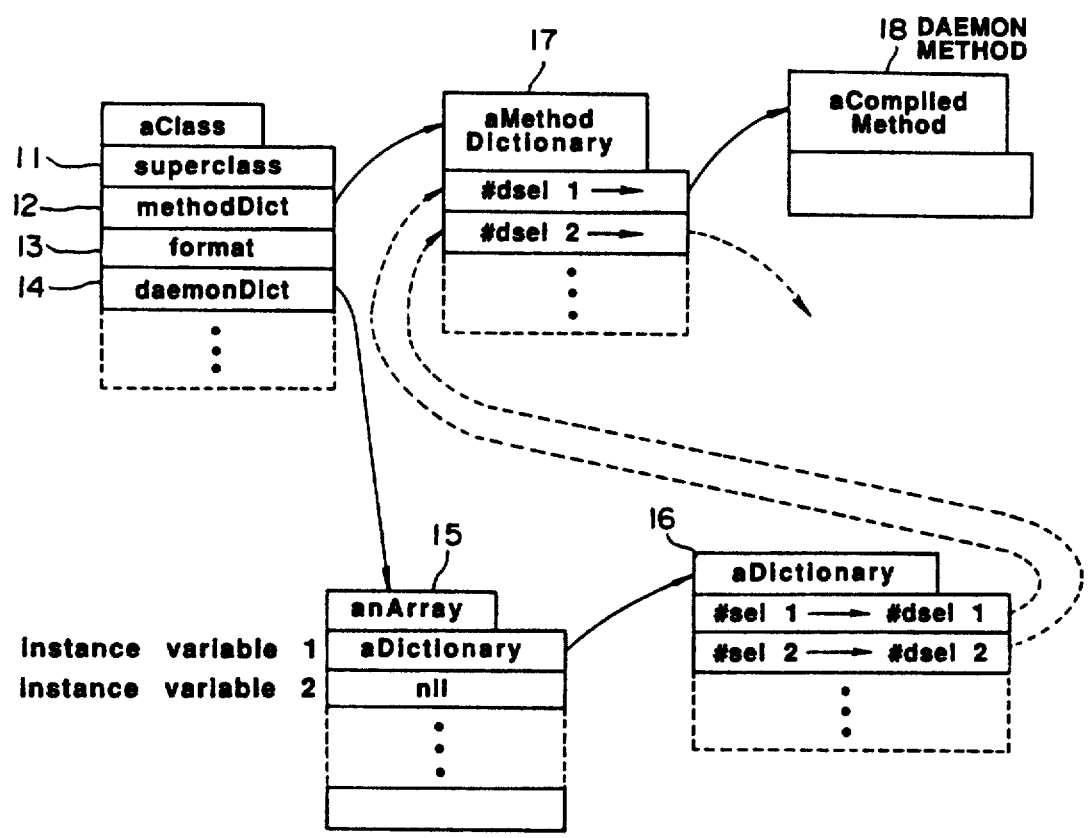
FIG. 2 shows a part of a structure of a class to which the whole object in the embodiment belongs.

Shown in FIG. 2 is a partial structure of a class to which the whole objects belong in the present embodiment. More specifically, there are provided a superclass column 11 ("superclass" column) in which a superclass to which the class belongs is described, a method dictionary column 12 ("methodDict" column) for method retrieval, a format column 13 ("format" column) in which object data are described, and a daemon dictionary column 14 ("daemonDict" column), etc. The present embodiment is different from the prior art in the provision of the daemon dictionary column 14.

The daemon dictionary column 14 has an array 15 in which retrieval data are stored in correspondence with the respective instance variables of all the objects belonging to the class. In each of the retrieval data stored in the array 15, a pointer "aDictionary" which indicates a daemon dictionary to be referenced is described if there is the daemon dictionary, otherwise "nil" is described if the daemon dictionary to be referenced is not present. Provided as associated with the retrieval data having the "aDictionary" described therein is a daemon dictionary 16 which has columns in which message selectors (referred to as "#sel n") as message names are stored as associated with daemon method selectors (referred to as "#dsel n") as daemon method names.

The message names contribute to the instance variables corresponding to the retrieval data in the array 15 which derives the daemon dictionary 16, and indicate receive messages of the part objects bound by the instance variables. That is, in the case where predetermined one of the instance variables is specified, the daemon dictionary 16 is retrieved through one of the retrieval data in the array 15 corresponding to the specified instance variable, whereby one of the receive message names of the part object bound by the specified instance variable can be retrieved and further one of the daemon method names corresponding to the retrieved message name can be found.

Meanwhile, the method dictionary column 12 has a method dictionary 17 in which method names and daemon method names are described. The method names indicate normal methods to be invoked through message transmission, while the daemon method names indicate daemon methods to be invoked at predetermined time (which will be described later). Therefore, through the retrieving operation of the method dictionary 17, a desired method name and a desired daemon method name can be retrieved to invoke a method designated by the retrieved method name and to invoke a daemon method 18 designated by the retrieved daemon method name.

With such a structure, when it is desired to send a message from a whole object to a part object, the set 4 (shown in FIG. 1) derived from the back pointer column 3 of the part object is retrieved to obtain the whole objects and the indices of instance variables of the whole objects, whereby the instance variables of all the whole objects binding the associated part object can be found. And in the class to which the whole objects belong, the array 15 (shown in FIG. 2) derived from the daemon dictionary column 14 is referenced so that, when the pointer "aDictionary" to the daemon dictionary is described in the column corresponding to the instance variable name, access is made to the daemon dictionary 16 indicated by the "aDictionary" and the daemon method name corresponding to the name of the message to the associated part object can be retrieved from the daemon dictionary 16. Further, the daemon method name is retrieved from the method dictionary 17 to access the daemon method indicated by the daemon method name and to execute the accessed daemon method.

Retrieval is carried out over the daemon dictionary column 14 of the class to which the whole objects belong as a matter of course, but it is further necessary to also retrieve the daemon dictionary column of the superclass further higher in hierarchy than the class to find the daemon dictionary columns of the instance variables binding the part object. In the illustrated example, the contents of the daemon dictionary column are present in the superclass higher in hierarchy than the class and can be inherited by the lower classes.

Explanation will next be made as to the specific operation of the present embodiment by referring to FIGS. 3, 4, 5 and 6.

Figure 3:
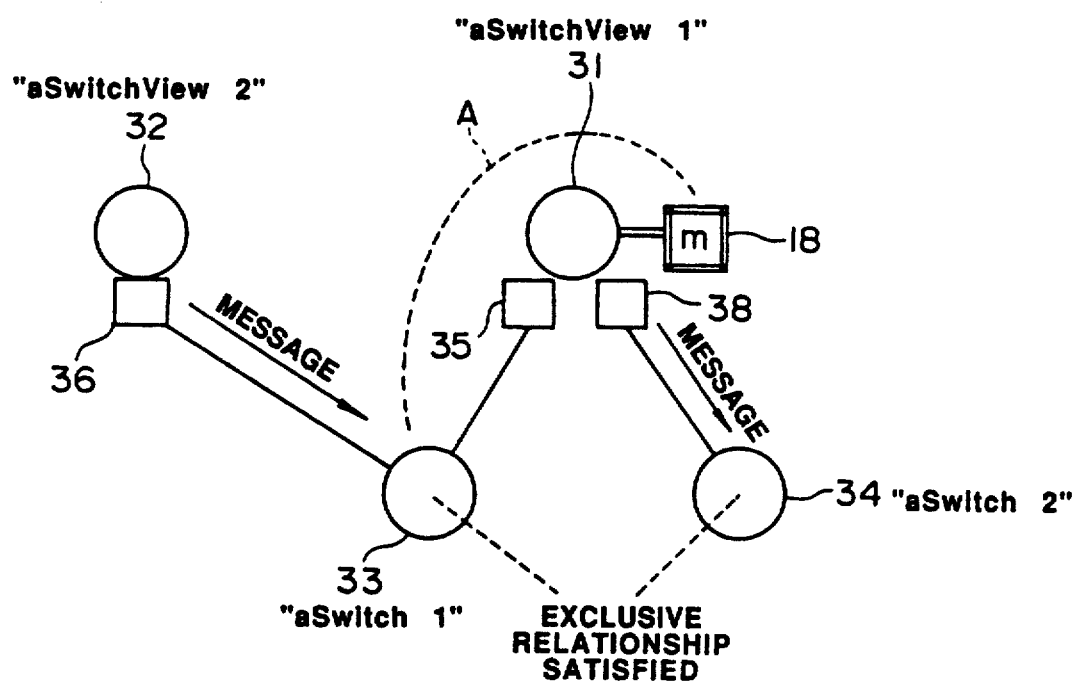
FIG. 3 shows a concrete example of a relationship between the objects in the embodiment.

First, it is assumed as shown in FIG. 3 that there are first and second whole objects 31 and 32 having names "aSwitchView 1" and "aSwitchView 2" as well as first and second part objects 33 and 34 having names "aSwitch 1" and "aSwitch 2" respectively. In this case, since the first part object 33 is bound by respective instance variables 35 and 36 of the first and second whole objects 31 and 32, the first and second whole objects 31 and 32 can send the message to the first part object 33.

It is assumed that, when a predetermined method (not shown) for the first whole object 31 is invoked, the two instance variables 35 and 36 of the first whole object 31 maintain a mutual exclusive relationship and correspondingly the exclusive relationship is also satisfied between the first and second part objects 33 and 34.

Assume for example that both of the first and second part objects 33 and 34 have instance variables "on" and "off" which hold either states of "true" or "false". Then, when the predetermined method of the first whole object 31 is invoked, the whole object 31 sends a message having a name "#turnOn" to the first part object 33 and also a message having a name "#turnOff" to the second part object 34, whereby the first part object 33 is put in such a state of "on=true" and "off=false" while the second part object 34 is put in such a state of "on=false" and "off=true". Also, when the predetermined method of the first whole object 31 is invoked, the whole object 31 sends the message having the name "#turnOff" to the first part object 33 and also the message having the name "#turnOn" to the second part object 34, whereby the first part object 33 is put in such a state of "on=false" and "off=true" while the second part object 34 is put in such a state of "on=true" and "off=false".

In the case where the first part object 33 is put in such a state of "on=false" and "off=true" while the second part object 34 is put in such a state of "on=true" and "off=false", when the second whole object 32 sends the message having the name "#turnOn" to the first part object 33, this causes the state of the first part object 33 to be changed to "on=true" and "off=false", at which time the second part object 34 is not changed in state. As a result, the exclusive relationship is not satisfied between the part objects 33 and 34.

Figure 4:
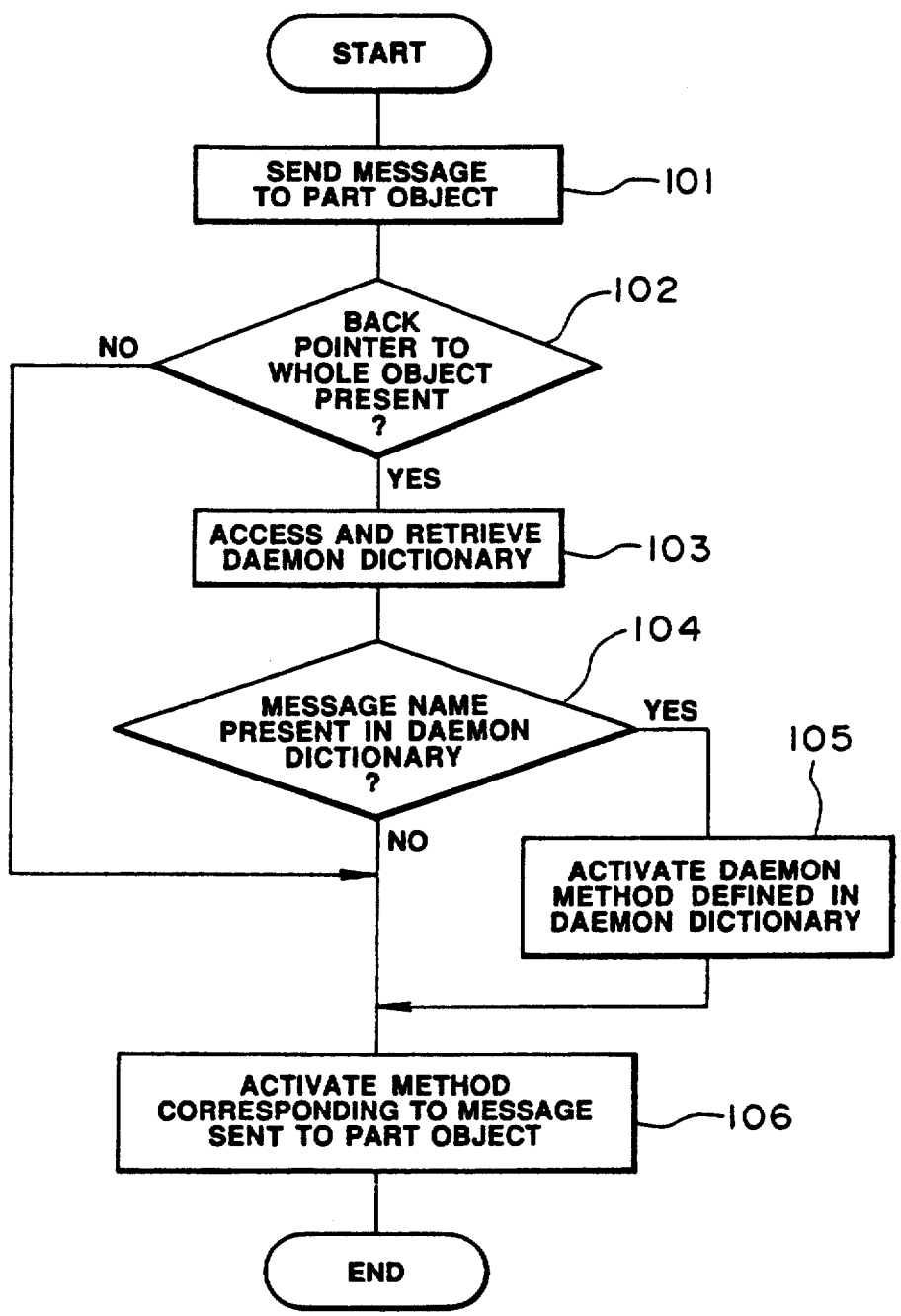
FIG. 4 is a flowchart for explaining the operation of the present embodiment.
Figure 5:
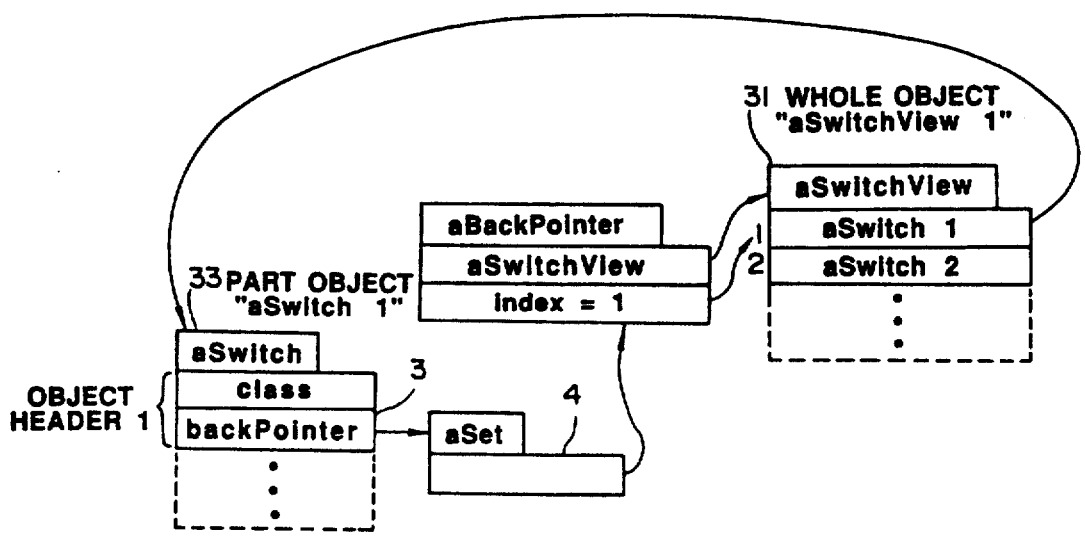
FIG. 5 shows exemplary details of the structure between the part and whole objects shown in FIG. 1.
Figure 6:
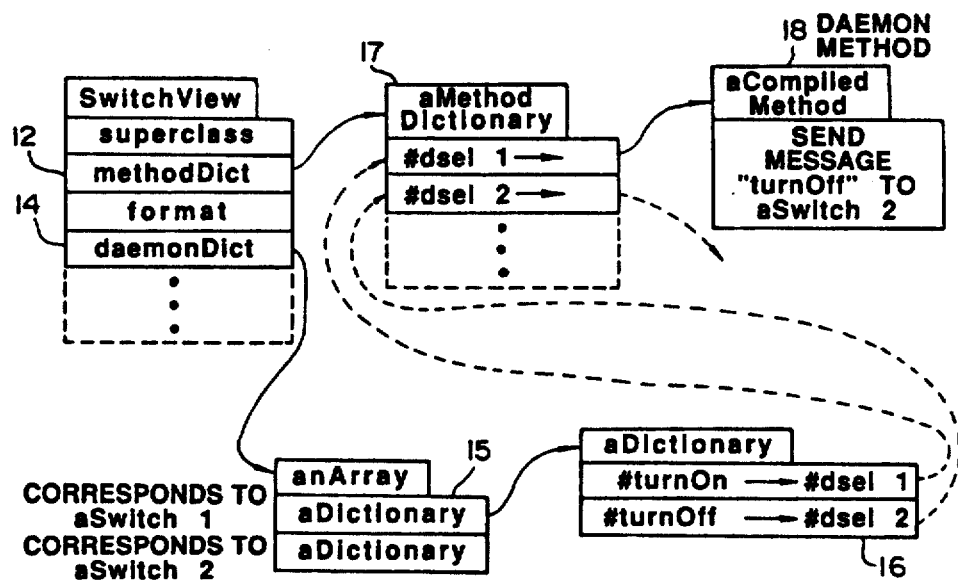
FIG. 6 shows exemplary details of the structure of the class shown in FIG. 2.

For the purpose of avoiding such situations, the operation of the present invention is carried out according to a flowchart of FIG. 4.

First, when it is desired to send the message "#turnOn" from the second whole object 32 to the first part object 33 (step 101), the system retrieves the set 4 (refer to FIG. 5) derived from the back pointer column 3 of the first part object 33 and judges whether or not the back pointers are stored in the set 4 (step 102). When at least one back pointer is stored in the set 4, the system reads out the back pointer. For example, the system reads out, as a back pointer, the first whole object 31 "aSwitchView 1" and an index "index=1" of the instance variable binding the first part object 33, and finds an instance variable "aSwitch 1" of the index "index=1" from the first whole object 31.

Next, the system accesses the class to which the first part object 33 belongs and the daemon dictionary column 14 (refer to FIG. 6) of the superclass higher in hierarchy than the class and retrieves the daemon dictionary 16 corresponding to the instance variable "aSwitch 1" (step 103). And the system judges whether or not the name "#turnOn" of the message sent from the second whole object 32 to the first part object 33 is present in the corresponding daemon dictionary 16 (step 104). The system, when determining the presence of the message name "#turnOn" in the daemon dictionary 16, finds a daemon method name "#dsel 1" corresponding to the message name "#turnOn" from the daemon dictionary 16, accesses the method dictionary 17 (refer to FIG. 6) of the method dictionary column 12, and then invokes a daemon method 18 indicated by the daemon method name "#dsel 1" (step 105). As a result, the message "#turnOff" is sent from the first whole object 31 to the second part object 34 so that the second part object 34 is changed to the state of "on=false" and "off=true" in response thereto.

In this way, when the message is sent from the second whole object 32 to the first part object 33, the system sends a message from the first part object 33 to the first whole object 31 through the back pointer and the daemon dictionary (indicated by an arrow A in FIG. 3), and invokes the daemon method 18 at the first whole object 31 to send the message from the first whole object 31 to the second part object 34 thereby changing the state of the second part object 34.

When the message "#turnOn" is sent from the second whole object 32 to the first part object 33, on the other hand, the first part object 33 is changed to the state of "on=true" and "off=false" in response thereto (step 106).

In this case, since the first part object 33 is in the state of "on=true" and "off=false" and the second part object 34 is in the state of "on=false" and "off=true", the exclusive relationship can be satisfied between the respective part objects regardless of the fact that the message is sent from the second whole object 32 to the first part object 33.

Incidentally, when the system determines that no back pointer is registered in the back pointer column 3 of the first part object 33 in the step 102 or that the name "#turnOn" of the message to be sent from the second whole object 32 to the first part object 33 is not present in the corresponding daemon dictionary 16 in the step 104, the system does not perform the processing of the step 105 and performs the processing of the step 106. In such a case, since the first part object 33 is changed to the state of "on=true" and "off=false" and the second part object 34 is not changed in state, the exclusive relationship cannot be satisfied between these part objects.

When the message "#turnOff" is sent from the second whole object 32 to the first part object 33, the system retrieves the back pointer column 3 of the first part object 33 to find the instance variable "aSwitch 1" of the first whole object 31, accesses the daemon dictionary 16 corresponding to the instance variable "aSwitch 1" to find a daemon method name "#dsel 2" corresponding to the message name "#turnOff", and accesses a daemon method indicated by the daemon method name "#dsel 2" in the method dictionary 17. And the system invokes the daemon method to send the message "#turnOn" from the first whole object 31 to the second part object 34, whereby the second part object 34 is changed to the state of "on=true" and "off=false". At this time, the first part object 33, in response to the message "#turnOff" received from the second whole object 32, is put in such a state that meets the exclusive relationship with the second part object 34.

When determining in the step 102 that a plurality of back pointers are registered in the back pointer column 3 of the first part object 33, the system carries out the processing of the steps 103 to 105 with respect to each of the plurality of back pointers. Accordingly, the sending of the message from the whole object to the part object may involve the invocation of a plurality of daemon methods.

In the present embodiment, in this way, when the message is sent from the second whole object to the first part object, the system invokes the daemon method corresponding to the instance variable of the first whole object binding the first part object to thereby send the message from the first whole object to the second part object, so that the exclusive relationship can be maintained between the first and second part objects.

Figure 7:
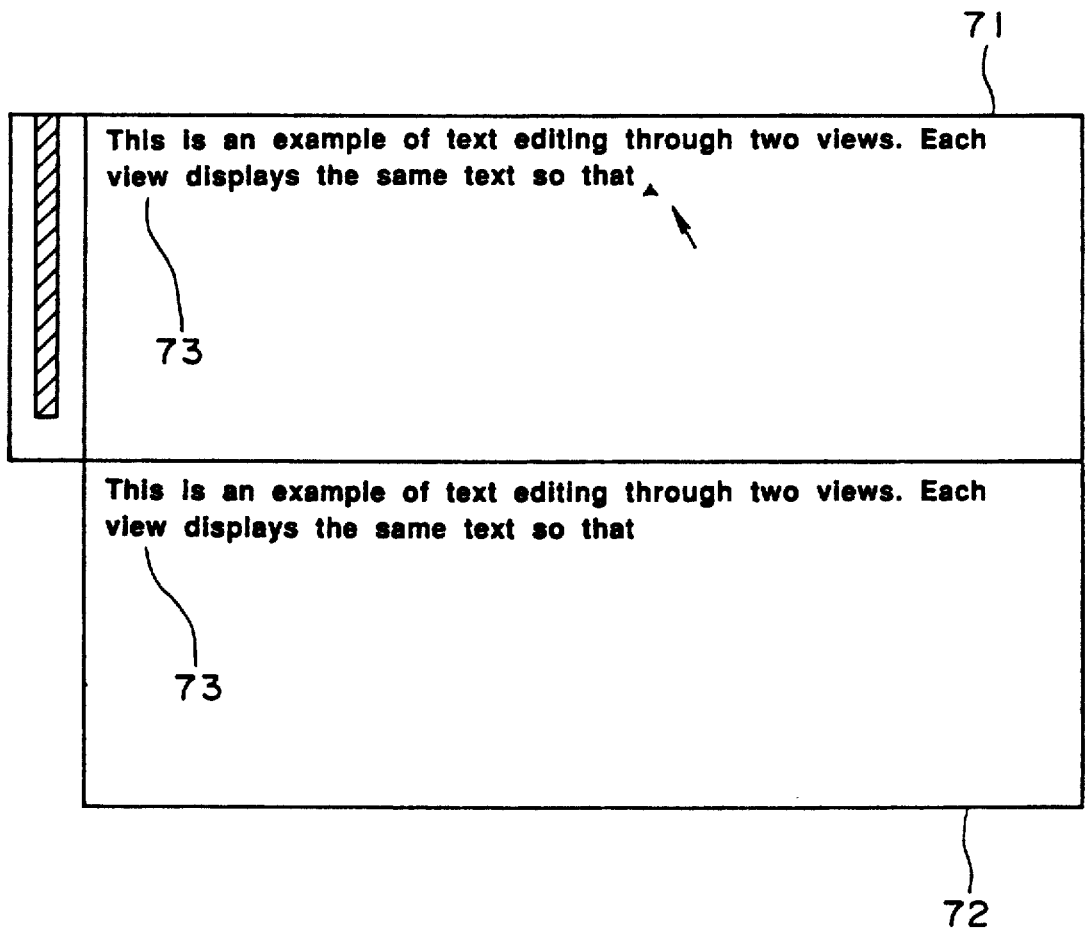
FIGS. 7, 8 and 9 are diagrams showing detailed application examples of the present invention respectively.
Figure 8:
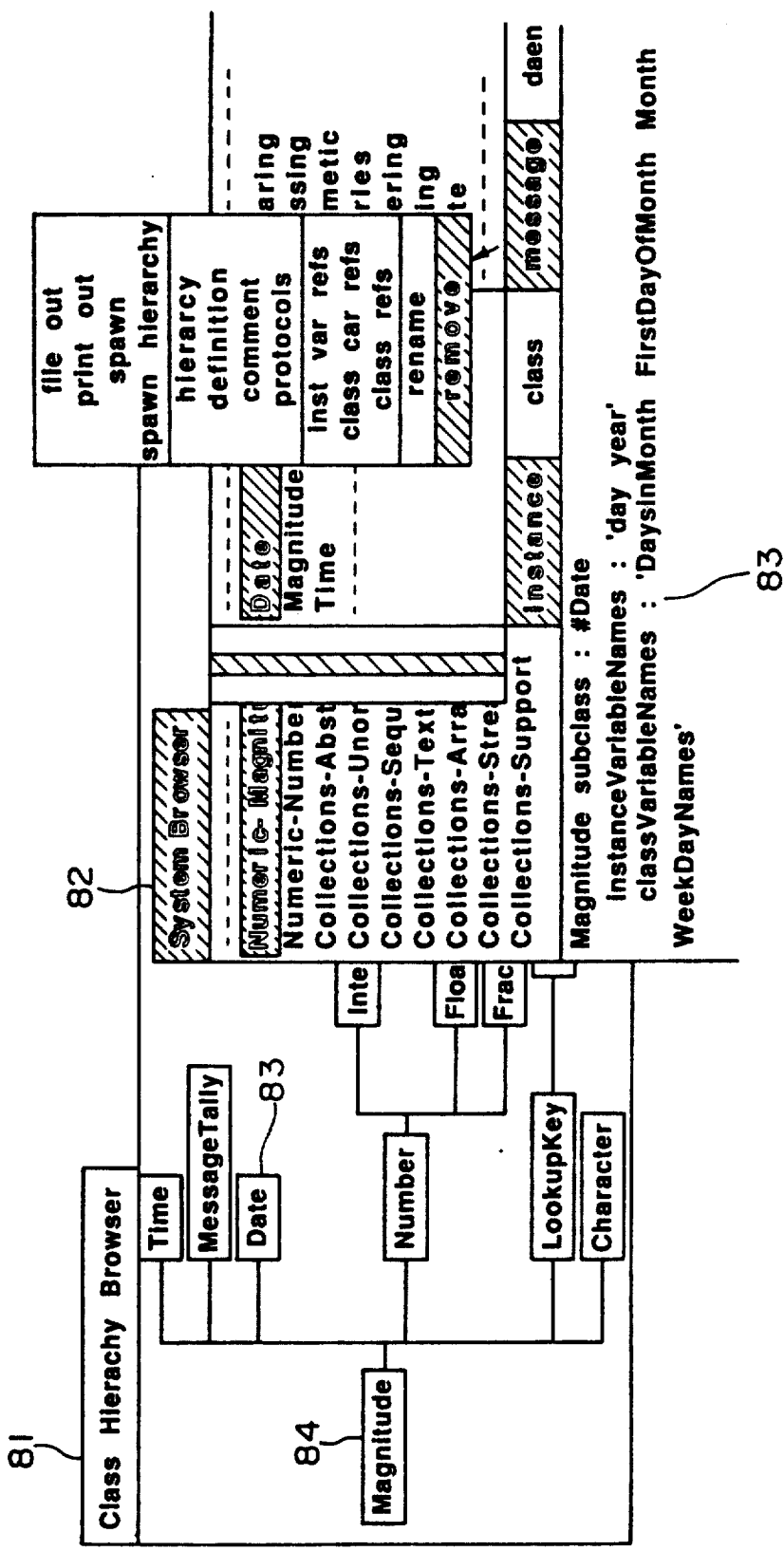
Figure 9A:
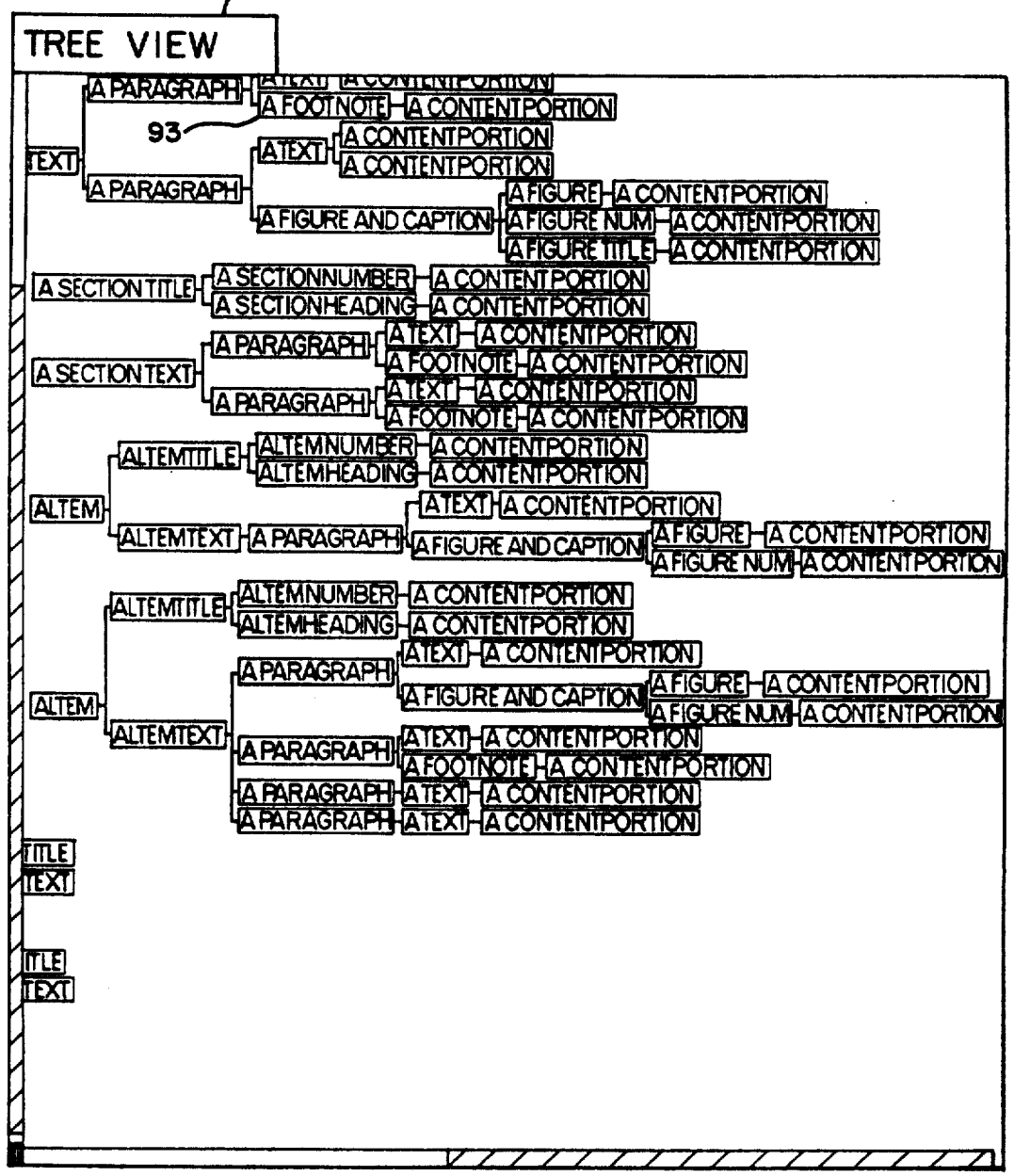
Figure 10:
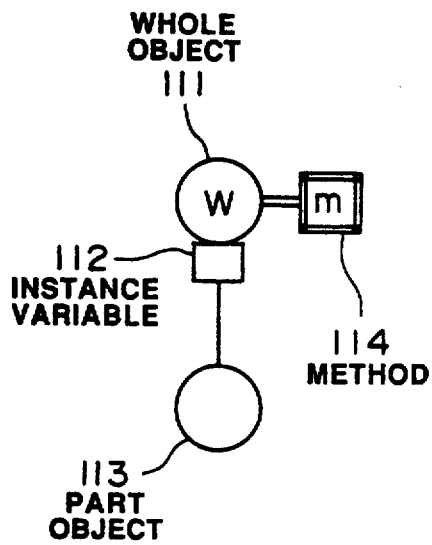
FIG. 10 shows an exemplary relationship between a whole object and a part object.
Figure 11:
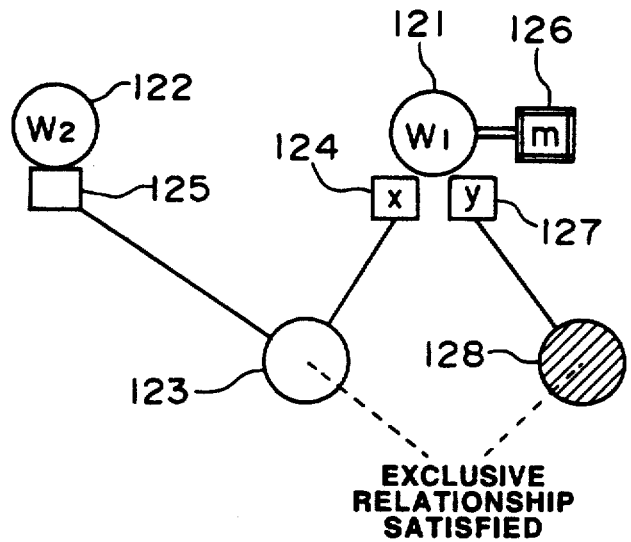
FIGS. 11 and 12 show a prior art relationship between the objects.
Figure 12:
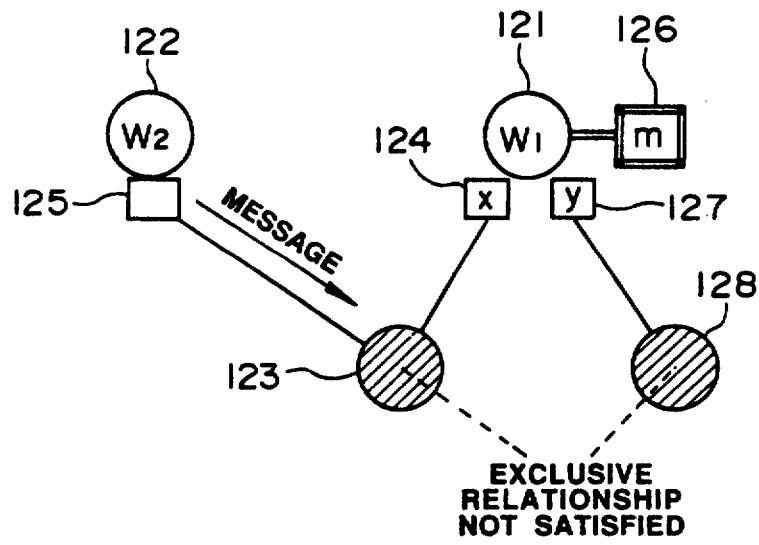

FIGS. 7, 8 and 9 show specific application examples of the present invention, which will be detailed below by referring to these drawings.

(1) Multiple Text Views

FIG. 7 shows multiple text views. A consideration is given to a system with multiple views of a single text. These text views must always display the current status of the text. Thus, each text view must be notified of changes in the text, which are typically done with the message "replaceFrom:to:with:" in Smalltalk-80.

In FIG. 7, first and second text views 71 and 72 are whole objects and a text 73 displayed in these text views is a part object which is to receive the message "replaceFrom:to:with:" from respective text view editors. For example, when the message is sent through the first text view 71 to the text 73 and the text 73 is changed, the daemon method for re-displaying the text 73 is invoked by a daemon of the text view 72 which is monitoring the message "replaceFrom:to:with:". As a result, the same content of the text 73 is displayed in the first and second text views 71 and 72.

(2) Class Hierarchy Browsers

A class hierarchy browser is a graphical user interface to the class hierarchy. Like the system browsers of Smalltalk-80, a class hierarchy browser allows the creation, deletion, and renaming of classes. If more than one class hierarchy browsers are open, all must be kept consistent with the class hierarchy. Thus, modifications to be class hierarchy from a class hierarchy browser should lead to updates in all class hierarchy browsers. Further, modifications from system browsers should also update all class hierarchy browsers.

In FIG. 8, a class hierarchy browser 81 and a system browser 82 are whole objects, while a class "Date" 83 is a part object. Since the class "Date" 83 is a subclass of a class "Magnitude" 84, when the class "Magnitude" 84 is developed from the class hierarchy browser 81, the class "Date" 83 is displayed as shown within the class hierarchy browser 81. When the class "Date" 83 is selected from the system browser 82, the class "Date" 83 is a displayed as shown within the system browser 82. Under such a condition, the deletion of the class "Date" 83 within the system browser 82 for example causes a daemon method of the class hierarchy browser 81 to be invoked. This results in that the class "Date" 83 within the class hierarchy browser 81 and within the system browser 82 are both deleted.

(3) Algorithm Animation

Algorithm animation is useful for understanding complicated algorithms. In the past, programs to be animated have had to be changed for algorithm animation. In other words, animation programs have not been hidden from animated programs. Thereby, it has been impossible to develop programs and their animation independently.

With the introduction of daemons, animation programs can be entirely hidden from animated programs. Animation programs have daemons monitoring the receipt of messages by the data structure of animated programs. Modifying the data structure by these messages fires the daemons. The fired daemons then invoke methods of the animation programs, which display the current status of the animated programs. Thus, animation programs can be developed without changing animated programs. We only have to consider messages to data structures of animated programs.

FIG. 9 shows a tree view 91 and a page view 92 displayed by an algorithm animation in a document generating system. The tree view 91 and the page view 92 are whole objects while a foot note 93 is a part object and is also one of document data. The tree view 91 displays the document data in the form of the tree structure. For example, the foot note 93 is displayed as shown within the tree view 91. Further, the page view 92 displays the document data as an image laid out in a page. For example, the foot note 93 is displayed as shown within the page view 92.

Explanation will be made as to how the program algorithm is animated with use of the daemons during execution of a page layout program for the document data. Assume now that the page layout program has sent a layout message to the footnote 93. Under this circumstances, the daemon method is monitoring the layout message and the footnote 93 is highlighted. In the same way, the daemon method is invoked by the daemon of the page view which is monitoring the layout message and the layout image of the footnote 93 within the page view 92 is displayed. The progress of the layout process of the document structure and the layout process of the document data on a page can be easily recognized by virtue of the realization of the algorithm animation using such daemons. In this example, since the attention should be paid only to the message which the page layout program sends to the document data, it is not required to be aware of the existence of the animation program.

What is claimed is:

1. A system for maintaining a mutual relationship between a plurality of objects in an object-oriented language computer system including a first whole object, a second whole object, and a plurality of part objects including at least one part object bound by said second whole object and having a specific mutual relationship bound by instance variables of said first whole object, said system comprising:

first storage means for storing therein a pointer which points out said first whole object from said at least one part object;

second storage means for storing therein indices indicating said instance variables of said first whole object;

third storage means for storing therein a method of said first whole object which maintains the specific mutual relationship between said plurality of part objects in correspondence with said instance variables of said first whole object and messages received by said part object from said second whole object; and method invoking means for retrieving said first whole object by referring to said pointer stored in said first storage means, deriving said instance variable of said first whole object by referring to said indices in said second storage means from said retrieved first whole object, determining that a method exists in the first whole object that maintains the said mutual relationship, determining that the said specific mutual relationship between the plurality of part objects remain valid, deriving said method of said first whole object stored in said third storage means from said derived instance variable and said message and invoking said derived method, when the said mutual relationship is determined to be not valid said method invoking means being executed when said messages are received from said second whole object, said message causing a method of said part object to invoked.

2. The system as set forth in claim 1, wherein said first storage means is provided in an object header of said at least one part object, and wherein said method invoking means derives said first whole object from a pointer of said object header and invokes said method of said first whole object which maintains the specific mutual relationship between said plurality of part objects based on said instance variables being indicated by said second storage means and said messages of said second whole object.

3. The system as set forth in claim 1, wherein said second storage means is provided in an object header of said at least one part object, and wherein said method invoking means invokes said method of said first whole object which maintains the specific mutual relationship between said plurality of part objects based on said instance variable indicated by indices of said object header and said messages.

4. The system as set forth in claim 1, wherein said third storage means is provided in a class to which said first whole objects belongs, and wherein said method invoking means retrieves and invokes said method of said first whole object which maintains the specific mutual relationship between said plurality of part objects from said methods provided to said class from said second whole object.

5. The system as set forth in claim 1, wherein a class of said at least one part object is provided and there is also included a subclass of said class for providing said first storage means and said second storage means as said instance variables to define said at least one part object by said subclass, whereby said first storage means and said second storage means are provided as said instance variables for said part objects itself, and wherein said method invoking means invokes said method of said first whole object and thereby maintains the specific mutual relationship between said plurality of part objects based on said instance variables and said messages received from said second whole object.

6. The system as set forth in claim 1, wherein said at least one part object is provided with a unique class, said unique class does not become a class of any other objects and said first storage means and second storage means are provided in said unique class of said at least one part object, and wherein said method invoking means invokes said method of said first whole object which maintains the specific mutual relationship between said plurality of part objects based on said pointer stored in said first storage means.

7. A method of maintaining a mutual relationship between a plurality of objects in an object-oriented language computer system including a first whole object, a second whole object having a message, a plurality of part objects having at least one part object bound by said second whole object and having a specific mutual relationship bound by instance variables of said first whole object, said method being activated when said at least one part object, said method being activated when said at least one part object receives said message from said second whole object, said message causing a method of said part object to be invoked, said method comprising:

a first step of retrieving said first whole object bounding said at least one part object by said instance variables;

a second step of retrieving said instance variable bounding said at least one part object, said instance variables being of said first whole object retrieved in said first step;

a third step of determining that a daemon method of said first whole object exists which maintains the specific mutual relationship between said plurality of part objects based on said instance variables retrieved in said second step and said message of said second whole object and retrieving the said daemon method; and a fourth step of determining that the said specific mutual relationship between the plurality of part objects remain valid, a fifth step of invoking said daemon method retrieved in said third step when said mutual relationship is determined to be not valid.

* * * * *